(12) United States Patent
Hara (10) Patent No.: US 9,014,475 B2
(45) Date of Patent: Apr. 21, 2015

(54) IMAGE PICKUP APPARATUS AND PHOTOGRAPHING METHOD OF IMAGE PICKUP APPARATUS

(71) Applicant: Olympus Imaging Corp., Shibuya-ku, Tokyo (JP)

(72) Inventor: Satoshi Hara, Hino (JP)

(73) Assignee: Olympus Imaging Corp., Tokyo (JP)

( * ) Notice: Subject to any disclaimer, the term of this patent is extended or adjusted under 35 U.S.C. 154(b) by 53 days.

(21) Appl. No.: 13/859,488

(22) Filed: Apr. 9, 2013

(65) Prior Publication Data

US 2013/0266222 A1    Oct. 10, 2013

(30) Foreign Application Priority Data

Apr. 10, 2012    (JP) ................... 2012-089450

(51) Int. Cl.
  *G06K 9/34* (2006.01)
  *G06T 5/40* (2006.01)
  *G06T 5/00* (2006.01)
  *G06T 5/50* (2006.01)

(52) U.S. Cl.
  CPC . *G06T 5/40* (2013.01); *G06T 5/005* (2013.01); *G06T 5/50* (2013.01); *G06T 2207/10016* (2013.01); *G06T 2207/30201* (2013.01)

(58) Field of Classification Search
  None
  See application file for complete search history.

(56) References Cited

U.S. PATENT DOCUMENTS

| | | | |
|---|---|---|---|
| 8,264,583 B2 * | 9/2012 | Yamaji et al. | 348/333.02 |
| 8,432,357 B2 * | 4/2013 | Ogura et al. | 345/158 |
| 8,482,651 B2 * | 7/2013 | Asukai et al. | 348/333.12 |
| 2007/0147826 A1 * | 6/2007 | Matsuzaki et al. | 396/287 |
| 2010/0066840 A1 * | 3/2010 | Asukai et al. | 348/207.1 |
| 2010/0091105 A1 * | 4/2010 | Watanabe | 348/140 |
| 2010/0157084 A1 * | 6/2010 | Shimamura et al. | 348/222.1 |
| 2011/0242336 A1 * | 10/2011 | Yamaji | 348/207.2 |

FOREIGN PATENT DOCUMENTS

JP    2009-182880    8/2009

* cited by examiner

*Primary Examiner* — Bhavesh Mehta
*Assistant Examiner* — Feng Niu
(74) *Attorney, Agent, or Firm* — John C. Pokotylo; Straub & Pokotylo (57) ABSTRACT

An image synthesis apparatus acquires one or plural images including one or plural pictures of one person or plural people as an object, determines an aspect of the one or plural pictures, extracts a part of the one or plural pictures in accordance with the aspect of the one or plural pictures and synthesizes the extracted one or plural images.

10 Claims, 7 Drawing Sheets

IMAGE PICKUP APPARATUS AND PHOTOGRAPHING METHOD OF IMAGE PICKUP APPARATUS

This application claims benefit of Japanese Application No. 2012-89450 filed in Japan on Apr. 10, 2012, the contents of which are incorporated by this reference.

BACKGROUND OF THE INVENTION

1. Field of the Invention

The present invention relates to an apparatus, a method and a program for extracting parts of an image and synthesizing them.

2. Description of Related Art

In recent years, portable apparatuses with a photographing function (photographing apparatuses) such as a digital camera have been provided with various photographing functions making full use of image processing. For example, Japanese Patent Publication No. 2009-182880 discloses an image pickup apparatus that determines a person's smile and automatically performs photographing or recording upon detecting a smile.

SUMMARY OF THE INVENTION

An image synthesis apparatus according to an aspect of the present invention is provided with an acquisition section that acquires one or plural images including one or plural pictures of one person or plural people as an object, a determining section that determines an aspect of the one or plural pictures, a trimming section that extracts a part of the one or plural pictures according to the aspect of the one or plural pictures, and a synthesis section that synthesizes the extracted one or plural images.

Furthermore, an image synthesis method according to an aspect of the present invention includes acquiring one or plural images including one or plural pictures of one person or plural people as an object, determining an aspect of the one or plural pictures, extracting a part of the one or plural pictures according to the aspect of the one or plural pictures, and synthesizing the extracted one or plural images.

Furthermore, in a non-transitory computer-readable recording medium having an image synthesis program according to an aspect of the present invention recorded therein, the image synthesis program includes a step of acquiring one or plural images including one or plural pictures of one person or plural people as an object, a step of determining an aspect of the one or plural pictures, a step of extracting a part of the one or plural pictures according to the aspect of the one or plural pictures, and a step of synthesizing the extracted one or plural images.

The above and other objects, features and advantages of the invention will become more clearly understood from the following description referring to the accompanying drawings.

DETAILED DESCRIPTION OF PREFERRED EMBODIMENTS

Hereinafter, embodiments of the present invention will be described in detail with reference to the accompanying drawings.

First Embodiment

Figure 1:
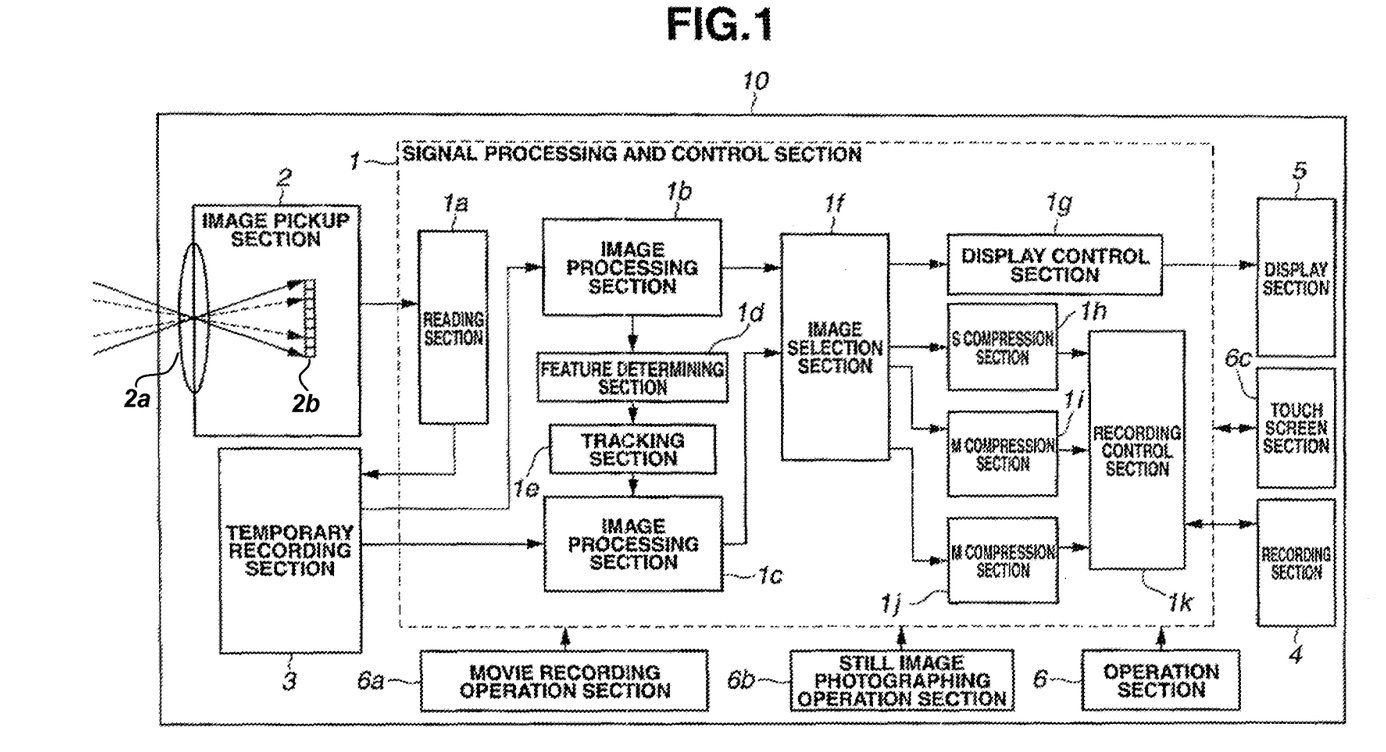
FIG. 1 is a block diagram illustrating a circuit configuration of a photographing apparatus according to a first embodiment of the present invention.

FIG. 1 is a block diagram illustrating a circuit configuration of a photographing apparatus 10 that constitutes an image synthesis apparatus according to a first embodiment of the present invention.

In FIG. 1, the photographing apparatus 10 is constructed of a signal processing and control section 1, an image pickup section 2, a temporary recording section 3, a recording section 4, a display section 5, an operation section 6, a movie recording operation section 6a, a still image photographing operation section 6b and a touch screen section 6c.

The signal processing and control section 1 outputs a drive signal for an image pickup device to the image pickup section 2 and also reads a picked-up image from the image pickup section 2. This picked-up image is read by a reading section 1a. The reading section 1a gives the picked-up image read from the image pickup section 2 to the temporary recording section 3. Furthermore, the signal processing and control section 1 further includes two image processing sections 1b and 1c that read picked-up images recorded in the temporary recording section 3 and perform image processing on the images.

The image processing sections 1b and 1c perform predetermined signal processing, for example, color signal generation processing, matrix transformation processing and various other kinds of signal processing on the inputted image. Furthermore, the image processing sections 1b and 1c are also configured to be able to perform various kinds of image processing such as resizing processing of resizing an inputted image and processing of generating an image of part of the inputted image (hereinafter referred to as "partial image").

A feature determining section 1d receives image information on the inputted image from the image processing section 1b, determines a feature value of an object such as a person's face and outputs the determination result to a tracking section 1e as information on the target object. The tracking section 1e tracks a region including a portion of the target object that matches in the feature value from sequentially inputted images and outputs the tracking result to the image processing section 1c.

Thus, the image processing section 1c is designed to be able to generate an image portion including the target object as a partial image while always tracking the image portion.

A movie and a still image from the image processing sections 1b and 1c are given to an image selection section 1f. The image selection section 1f selects the inputted movie and still image, gives them to a display control section 1g and also gives them to an S compression section 1h, an M compression section 1i and an M compression section 1j.

The display control section 1g performs display processing for giving the inputted movie and still image to the display section 5 to display the movie and the image. On the other hand, the S compression section 1*h* compresses the inputted still image and gives the compressed image to a recording control section 1*k*, and the M compression sections 1*i* and 1*j* compress the inputted movie and give the compressed movie to the recording control section 1*k*. The recording control section 1*k* gives the compressed movie and the compressed still image to the recording section 4 to record the movies and the image.

The image pickup section 2 is constructed of an optical system 2*a* and an image pickup system 2*b*. The optical system 2*a* is configured to be able to control the aperture stop, focusing, zooming or the like, and forms an object image on the image pickup system 2*b*. The image pickup system 2*b* is constructed of an image pickup device such as a CCD or CMOS sensor, picks up an image of the object and outputs the picked-up image.

The temporary recording section 3 has a capacity for storing a picked-up image from the image pickup section 2 for a predetermined period and, stores and retains the picked-up image (movie and still image) read from the image pickup section 2.

The recording section 4 records the inputted compressed movie and compressed still image under the control of the recording control section 1*k*. For example, a card interface can be used as the recording section 4 and the recording section 4 records image data and sound data or the like in a recording medium such as a memory card.

The display section 5 is made up of an LCD or the like and displays a movie or a still image given from the display control section 1*g*.

The operation section 6 has various switches and buttons for setting a photographing mode or the like, generates an operation signal based on the user's operation and supplies the signal to the signal processing and control section 1. The movie recording operation section 6*a* is intended to instruct movie recording, and when the movie recording operation section 6*a* is operated, an operation signal to start movie recording is supplied to the signal processing and control section 1.

Furthermore, the still image photographing operation section 6*b* is intended to instruct still image photographing, and when the still image photographing operation section 6*b* is operated, an operation signal to start still image photographing is supplied to the signal processing and control section 1. The signal processing and control section 1 controls the respective sections based on the operation signal.

The touch screen section 6*c* generates an operation signal based on a touch operation by the user's finger or the like and supplies the operation signal to the signal processing and control section 1. For example, when the touch screen section 6*c* is provided on the display screen of the display section 5, an operation signal can be generated according to the position on the display screen pointed by the user's finger. This allows the user to easily perform operation such as selection and deletion of a partial image displayed on the display screen of the display section 5.

As described above, the signal processing and control section 1 controls the above-described sections, and thereby sets a photographing mode based on the user's operation and realizes a photographing function in accordance with respective photographing modes. For example, the signal processing and control section 1 can set a best shot synthesis mode in addition to a normal photographing mode.

The photographer picks up an image or records a movie at timing judged by the photographer himself/herself to be the right moment to take a picture based on the situation on the spot. Therefore, in the best shot synthesis mode, determination of the photographing timing is left to the photographer's operation and the picked-up image or recorded movie is displayed on the full screen and recorded. This enables photographing that reflects the photographer's intention.

On the other hand, it is effective to watch part of the object, for example, the face to relive the atmosphere on the spot or the like during playback. Thus, some partial images are extracted from the photographed image. Since such a partial image is small in size, even when the partial image is synthesized with the photographed image, the partial image does not block the photographed image and it is possible to obtain a photographed image full of variety. Note that, as the partial image, it is possible to obtain a much more enjoyable photographed image by selecting an expressive facial image of the object, for example, a facial image having a variation relative to the photographed image.

FIG. 2A to FIG. 2H are diagrams for illustrating such a best shot synthesis mode.

Figure 2A:
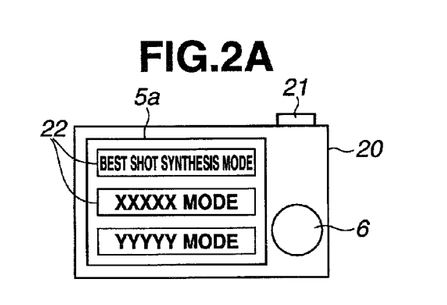
FIG. 2A to FIG. 2H are diagrams illustrating a best shot synthesis mode.

FIG. 2A shows a mode selection screen. A photographing apparatus body 20 that incorporates the photographing apparatus 10 in FIG. 1 includes a shutter button 21 that corresponds to the still image photographing operation section 6*b* on the top surface. A display screen 5*a* of the display section 5 and the operation section 6 are provided on the back surface of the photographing apparatus body 20. The display screen 5*a* shows some selection buttons 22 of a best shot synthesis mode, and an XXXXX mode and a YYYYY mode or the like as other modes. When the user specifies the best shot synthesis mode by operating the operation section 6, the signal processing and control section 1 sets the best shot synthesis mode.

Figure 2B:
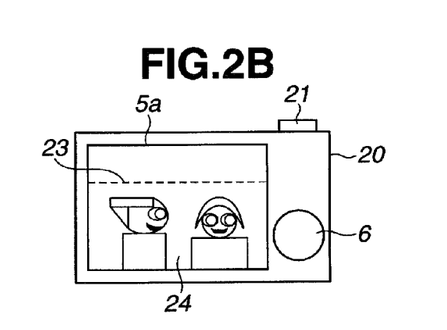

FIG. 2B shows a live view image display in the best shot synthesis mode. A picked-up image from the image pickup section 2 is supplied to the temporary recording section 3 via the reading section 1*a*, further supplied from the temporary recording section 3 to the image processing sections 1*b* and 1*c* and a live view image is generated. In the present embodiment, in the best shot synthesis mode, the signal processing and control section 1 causes the temporary recording section 3 to temporarily record a picked-up image even while a live view image is being displayed.

In the present embodiment, in the best shot synthesis mode, the signal processing and control section 1 synthesizes a best shot image, which is a partial image, with a partial region of the photographed image as will be described later. In this case, in order to prevent the best shot image from being superimposed on and thus hiding a part of the photographed image considered important by the photographer, the display control section 1*g* shows a synthesis frame 23 that indicates the position at which the best shot image is synthesized as shown in FIG. 2B. In the example of FIG. 2B, the best shot image is synthesized in a region above the broken line portion which is the synthesis frame 23.

Figure 2C:
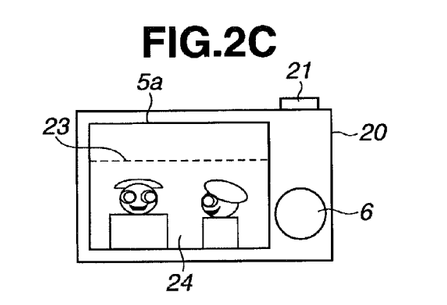

FIG. 2B shows a scene in which images of two people are picked up as a live view image 24. FIG. 2C shows a scene in which a time has elapsed from the state in FIG. 2B and the statuses of the two people appearing in the live view image 24 have changed.

When the photographer presses the shutter button 21 in the state of FIG. 2C, the signal processing and control section 1 controls the temporary recording section 3 to stop the temporary recording the movie and causes the display section 5 to display the image displayed at the time to press the shutter button 21, that is, for displaying the photographed image (hereinafter, referred to as "rec view display").

Figure 2D:
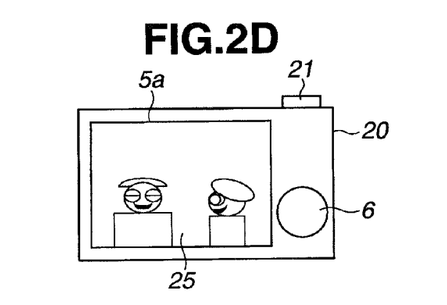

FIG. 2D shows a photographed image 25 shown by a rec view display. Furthermore, the signal processing and control section 1 selects a best shot image from among partial images acquired during temporary recording of movies, synthesizes the selected best shot image with the photographed image 25 and displays the synthesized image.

Figure 2E:
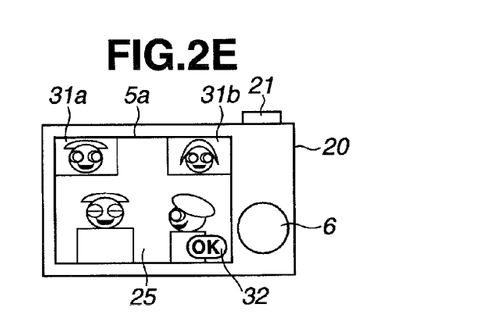

FIG. 2E shows this synthesized image. In FIG. 2E, best shot images 31a and 31b are synthesized superimposed on a partial region above the photographed image 25 displayed on the display screen 5a. The best shot image 31a is the best shot image corresponding to the person on the left side photographed in the photographed image 25 and the best shot image 31b is the best shot image corresponding to the person on the right side photographed in the photographed image 25.

Note that the best shot images are assumed to be images obtained by capturing a person at preferable moments through quantization using shapes and positions of parts of the face, using the degree of a smile or using the angle of the face, the eye line, pose or the like. As will be described later, differences in expression and differences in pose or the like are quantized so as to be classified into different levels for a selection of best shot images.

In the present embodiment, the signal processing and control section 1 is designed to synthesize the photographed image 25 displayed in a rec view, that is, a photographed image at timing at which the photographer performs photographing operation with the best shot image and record the synthesized image. In this case, the signal processing and control section 1 is designed to be able to allow the user to select an image to be synthesized as the best shot image.

For example, in FIG. 2E, an OK button 32 is shown to indicate that the displayed best shot images 31a and 31b may be synthesized and recorded. When this OK button 32 is operated, a synthesized image of the displayed photographed image 25 and the best shot image is recorded.

Figure 2F:
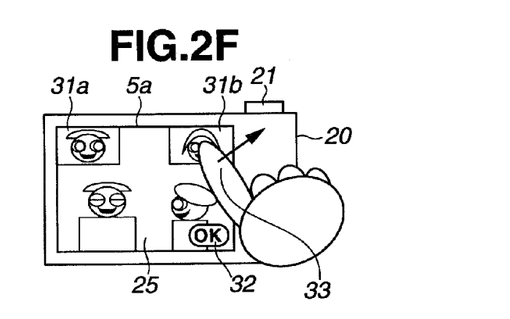

Furthermore, the photographer can also perform an operation to cancel the synthesis of the displayed best shot images. FIG. 2F shows this cancelation operation and this best shot image 31b is deselected by the photographer touching the displayed the best shot image 31b by a finger 33 and then sliding it in a direction shown by an arrow in FIG. 2F.

Figure 2G:
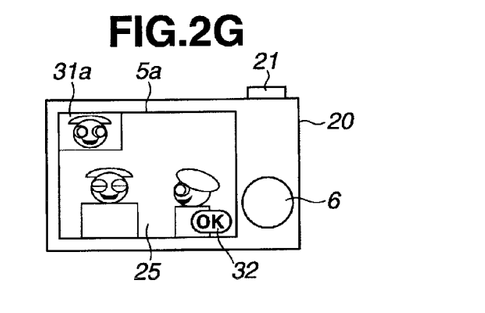
Figure 2H:
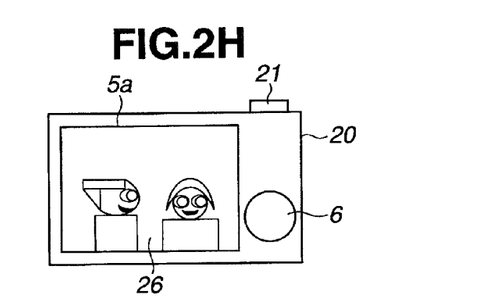

Note that a message like "delete by sliding" may also be displayed on the display screen. FIG. 2G shows a status after the deselection, and only the best shot image 31a is displayed for synthesis above the photographed image 25. When the OK button 32 is operated in this state, the best shot image 31 is synthesized with the photographed image 25 and recorded. FIG. 2H shows a status which is returned to a live view image display 26 after the photographed image is recorded.

Figure 3:
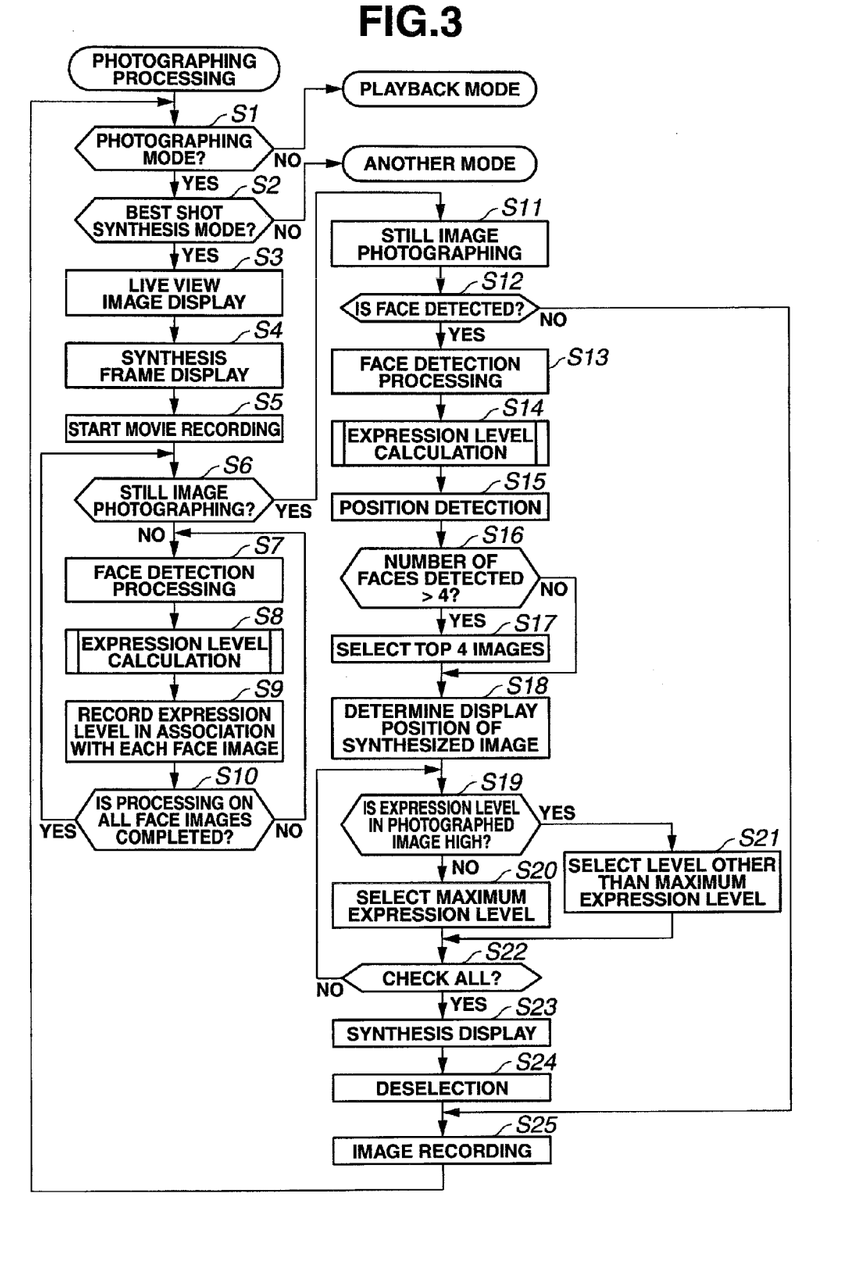
FIG. 3 is a flowchart for illustrating operation according to the first embodiment.
Figure 4A:
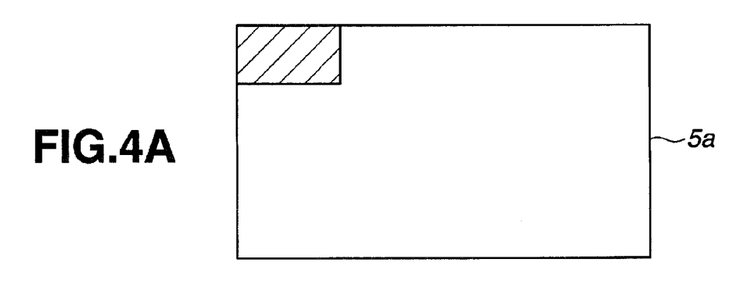
FIG. 4A to FIG. 4D are diagrams for illustrating operation according to the first embodiment.
Figure 4B:
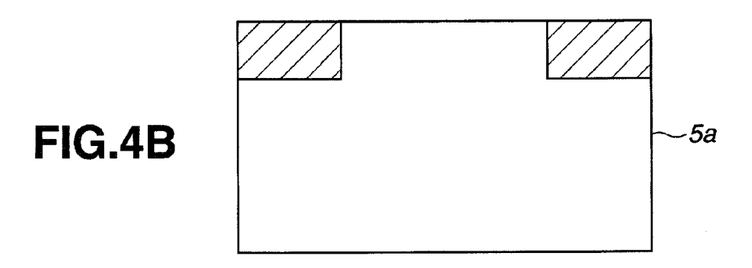
Figure 4C:
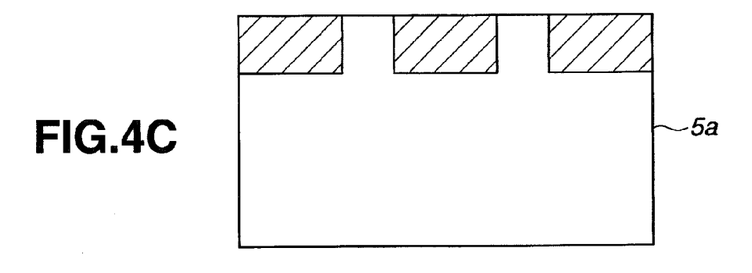
Figure 4D:
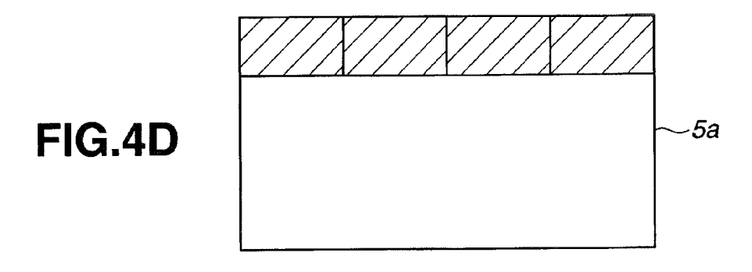

Next, the operation of the embodiment configured as shown above will be described with reference to a flowchart in FIG. 3 and diagrams in FIG. 4A to FIG. 4D.

The signal processing and control section 1 determines in step S1 whether or not the photographing mode is specified. If the photographing mode is not specified, the signal processing and control section 1 moves to a playback mode. If the photographing mode is specified, it is determined in step S2 whether or not the best shot synthesis mode is specified. If the best shot synthesis mode is not specified, the signal processing and control section 1 moves to another mode.

Suppose the user specifies the best shot synthesis mode through operation on, for example, the selection buttons 22 in FIG. 2A. The signal processing and control section 1 then displays a live view image in step S3. That is, the reading section 1a gives a picked-up image from the image pickup section 2 to the temporary recording section 3 and the image processing section 1b performs image processing on the picked-up image from the temporary recording section 3 and gives the processed picked-up image to the display control section 1g via the image selection section 1f. The display control section 1g causes the display section 5 to display the inputted picked-up image. Furthermore, the signal processing and control section 1 causes the display control section 1g to display the synthesis frame 23 (step S4).

In the present embodiment, the signal processing and control section 1 performs movie recording in the best shot synthesis mode. That is, the signal processing and control section 1 causes the temporary recording section 3 to record the picked-up image supplied thereto just as it is (step S5). Thus, the live view image is displayed as shown in FIG. 2B and FIG. 2C, and the displayed live view image is recorded in the temporary recording section 3.

In next step S6, the signal processing and control section 1 determines whether or not still image photographing is performed. In the present embodiment, in steps S7 to S10, the signal processing and control section 1 performs processing of detecting the best shot image which is a partial image to be synthesized from the movie temporarily being recorded until still image photographing is performed.

In step S7, the signal processing and control section 1 performs face detection processing. That is, the signal processing and control section 1 detects the face of a person in the photographed image by applying a publicly known face detection technique to the picked-up image. For example, the signal processing and control section 1 may adopt a technique of detecting a person's face by sequentially comparing plural shade images that model brightness features of the face with a photographed image. Furthermore, the signal processing and control section 1 determines the direction in which the object such as the face is located (face direction) from the position of the detected object in the picked-up image. Furthermore, the signal processing and control section 1 can also determine whether the mouth is open or closed like during a conversation by using a database that stores features of face parts and also calculating a frame correlation. The signal processing and control section 1 associates these determination results with the detected respective faces and causes the temporary recording section 3 to record the results.

Next, in step S8, the signal processing and control section 1 calculates an expression level of each detected face, which will be described later. For example, the expression level has a higher value for an image determined to be a more smile-like expression, and the signal processing and control section 1 may designate the image with the highest expression level as the best shot image.

Furthermore, as long as the expression level represents an expression of the object and expresses a situation at that time, the expression level may also be set to become highest with a "crying face" or "angry face" instead of a smile.

Furthermore, the best shot image may be selected based on not only the face but also the pose. In this case, a value corresponding to the pose of the object may be acquired as the expression level. For example, the expression level may be set to become highest when the object shows a specific pose such as a victory pose by raising the first in the air.

Furthermore, the expression level may be set so as to increase when the expression changes significantly. In step S9, the signal processing and control section 1 associates each detected face image with the expression level and records them in the temporary recording section 3. In step S10, the signal processing and control section 1 determines whether or not the processing of expression levels on all faces has ended and repeats the processing in steps S7 to S9 until the processing on all faces ends.

Here, suppose the photographer performs photographing by pressing the shutter button 21. In step S11, the signal processing and control section 1 performs still image photographing. That is, the signal processing and control section 1 stops the reading processing of the reading section 1*a* and causes the display control section 1*g* to display the picked-up image being displayed as a still image just as it is. Next, in steps S12 to S24, the signal processing and control section 1 performs synthesis processing of synthesizing the best shot image with the photographed image.

First, the signal processing and control section 1 determines whether or not the face is detected through the face detection processing in step S7 (step S12). If the face is not detected, there is no best shot image to be synthesized, and therefore the signal processing and control section 1 records the photographed image in step S25 without performing synthesis processing.

When the face is detected through the face detection processing, the signal processing and control section 1 detects a face in the photographed image displayed in a rec view in next steps S13 and S14 through processing similar to that in steps S7 and S8 and also calculates the expression level. Furthermore, the signal processing and control section 1 detects at which position on the display screen 5*a* the face in the photographed image is displayed (step S15).

As shown in FIG. 2E, the best shot images to be synthesized with the photographed image are displayed in a horizontal row in correspondence with the sequence of people as objects in the photographed image. For example, when the best shot image is too small, the expression of the face in the best shot image is undeterminable.

On the other hand, when the best shot image is too large, the effective region of the photographed image on which the best shot images are not superimposed becomes narrower. Furthermore, when best shot images of a sufficient size are displayed in two rows, the effective region of the photographed image also becomes narrower.

Furthermore, visibility would improve if the aspect ratio of the best shot image to be synthesized matches the aspect ratio of the display screen.

From the above-described standpoint, by setting the size of the best shot image to the order of ¼ the size of the display screen 5*a* in consideration of the display screen size of the display section of a general camera or the like, it may be possible to sufficiently recognize the expression of the face in the best shot image and prevent visibility of the photographed image from deteriorating considerably. For the above-described reasons, the number of best shot images which are partial images to be synthesized is assumed to be 4 or less. That is, best shot images of four or fewer people in the photographed image are synthesized.

The signal processing and control section 1 determines whether or not the number of faces detected in the photographed image is more than 4 (step S16). When the number of faces is more than 4, the signal processing and control section 1 selects only four faces in step S17. For example, the signal processing and control section 1 selects four images in descending order of size, four images on the center side of the screen, four images in ascending order of the expression level, and so on. Note that the signal processing and control section 1 may also display a message for a selection on the display screen 5*a* and prompt the user to select four faces. When the number of faces in the photographed image is four or fewer, the signal processing and control section 1 moves the process from step S16 to step S18.

Note that, even when the number of partial images is five or more, the expression in partial images may be sufficiently recognizable depending on the size or the like of the display screen 5*a*, and the number of partial images is therefore not necessarily limited to four.

In step S18, the signal processing and control section 1 determines the positions at which the best shot images are arranged. That is, in correspondence with the horizontal positions of the faces of the four or fewer people selected from the photographed image, the signal processing and control section 1 determines the display positions of the best shot images corresponding to the selected people.

FIG. 4A to FIG. 4D show examples of arrangement of best shot images to be synthesized on the display screen 5*a*.

FIG. 4A to FIG. 4D are examples where the number of best shot images to be arranged is 1 to 4. As shown in FIG. 4A to FIG. 4D, best shot images are arranged in a region shown by a broken line in the upper part of the display screen 5*a*.

Next, the signal processing and control section 1 compares the expression level of a face in a photographed image with the expression level of a corresponding best shot image for each selected person in the photographed image (step S19). When the expression level of the face in the photographed image is lower than the expression level of the corresponding best shot image, the signal processing and control section 1 selects the best shot image with the highest expression level (step S20).

Furthermore, when the expression level of the face in the photographed image is higher than the expression level of the best shot image, the signal processing and control section 1 selects a best shot image other than that with the maximum expression level, for example, a best shot image with an expression level corresponding to a crying face or angry face if, for example, the maximum expression level is assumed to be obtained in the case of a smile (step S21).

According to the determination in step S22, the signal processing and control section 1 repeats the processing in steps S19 to S21 until the processing on all the selected people in the photographed image ends. When the processing on the selected people ends, the signal processing and control section 1 displays the synthesized image in step S23.

That is, the signal processing and control section 1 synthesizes a best shot image selected for each person in steps S20 and S21 with the photographed image at the position corresponding to the horizontal position of the selected person in the photographed image and displays the synthesized image. The image processing section 1*c* reads the best shot images selected from the temporary recording section 3 and outputs the best shot images to the image selection section 1*f*. The image selection section 1*f* synthesizes the photographed image from the image processing section 1*b* with the best shot image and outputs the synthesized image to the display control section 1*g*. The display control section 1*g* gives the synthesized image to the display section 5 so as to be displayed thereon.

FIG. 2E shows this status and the best shot images 31*a* and 31*b* selected for the respective persons are displayed synthesized at the positions corresponding to the two people in the photographed image 25. The signal processing and control section 1 receives an operation of deselecting the best shot image by the photographer in step S24 (see FIG. 2F). When the deselection operation is performed, the image selection section if deselects the corresponding best shot image.

Thus, a synthesized image as shown in FIG. 2G is obtained. When the photographer operates the OK button 32, the synthesized image is determined Thus, the signal processing and control section 1 records the synthesized image (step S25). That is, the image selection section 1*f* determines the image to be synthesized and gives the synthesized image to the S compression section 1h. The synthesized image is compressed by the S compression section 1h and recorded in the recording section 4 by the recording control section 1k.

Note that, when there is enough space in the display region for best shot images, plural best shot images per person in the photographed image may be displayed. For example, best shot images may be selected in descending order of expression levels.

Thus, the present embodiment synthesizes best shot images selected by classifying expression levels from movies at the time of the live view image with the photographed image corresponding to the photographing operation of the photographer and records the synthesized image. The photographer can photograph an optimum object in accordance with the atmosphere on the spot at timing determined by the photographer, and can also display and record best shot images of the object photographed at other than the photographing timing together therewith.

This makes it possible to simply photograph an object that matches the atmosphere on the spot in accordance with the photographer's intention. Note that, in order to select best shot images, not only numerical values of expression based on face images but also poses may be quantized and classified as expression levels, and further poses may be classified in accordance with changes in these numerical values.

Note that the present embodiment has described an example in which one still image is synthesized with a photographed image, but, by selecting plural still images acquired from a movie at predetermined timing or selecting plural still images in accordance with expression levels, it is also possible to sequentially synthesize plural varying still images with one photographed image and display the synthesized image.

Second Embodiment

FIG. 5A to FIG. 5E are diagrams for illustrating a second embodiment of the present invention. The hardware configuration of the present embodiment is the same as that in FIG. 1. The present embodiment is different from the first embodiment only in the operation of the best shot synthesis mode. The present embodiment corresponds to synthesis of best shot images applied to recorded movie.

FIG. 5A to FIG. 5E illustrate a best shot synthesis mode according to the present embodiment. In FIG. 5A to FIG. 5E, the same components as those in FIG. 2A to FIG. 2H will be assigned the same reference numerals and description thereof will be omitted.

Figure 5A:
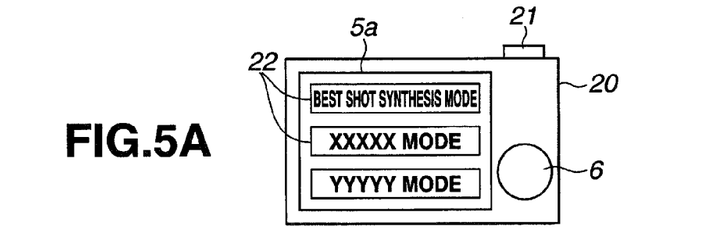
FIG. 5A to FIG. 5E are diagrams for illustrating a second embodiment of the present invention.

FIG. 5A shows a mode selection screen. The display screen 5a shows a selection buttons 22 of a best shot synthesis mode, and an XXXXX mode and a YYYYY mode or the like as other modes. When the user specifies the best shot synthesis mode by operating the operation section 6, the signal processing and control section 1 sets the best shot synthesis mode.

Figure 5B:
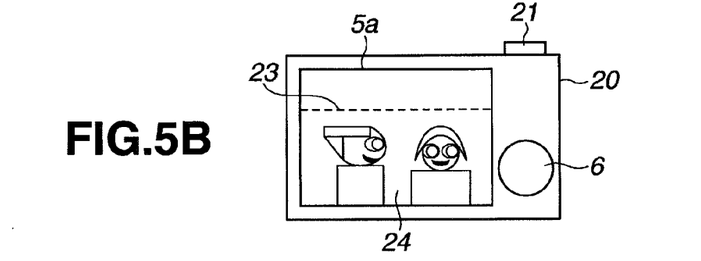

FIG. 5B shows a live view image display in the best shot synthesis mode. FIG. 5B shows a scene in which images of two people are picked up as a live view image 24. The picked-up image from the image pickup section 2 is supplied to the temporary recording section 3 via the reading section 1a, further supplied from the temporary recording section 3 to the image processing sections 1b and 1c, and a live view image is thereby generated. In the present embodiment, when the best shot synthesis mode starts, the signal processing and control section 1 gives the picked-up image to the compression sections 1i and 1j, compresses the picked-up image and the recording control section 1k records the picked-up image in the recording section 4.

In the present embodiment, the signal processing and control section 1 also synthesizes a best shot image which is a partial image with a partial region of the photographed image in the best shot synthesis mode. In this case, in order to prevent the best shot image from being superimposed on and thus hiding a part of the photographed image considered important by the photographer, the display control section 1g shows a synthesis frame 23 indicating the position at which the best shot image is synthesized as shown in FIG. 5B. In the example of FIG. 5B, the best shot image is synthesized in a region above the broken line portion which is the synthesis frame 23.

Figure 5C:
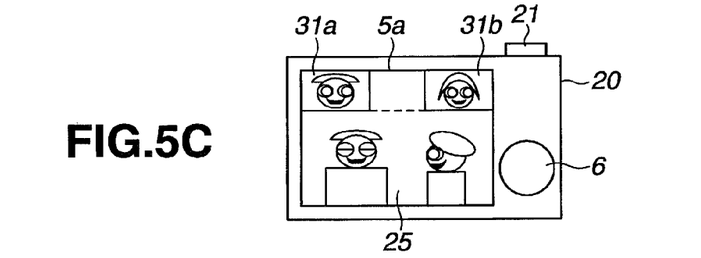
Figure 5D:
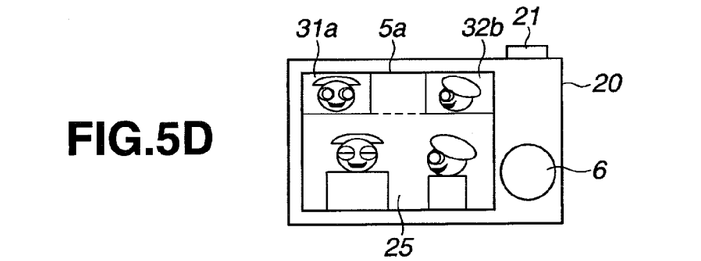

FIG. 5B to FIG. 5D show scenes in which the picked-up image changes as the time elapses. In the present embodiment, a picked-up image of the face of a person whose image is picked up is extracted from a movie being picked up and the extracted face image is synthesized with the picked-up image and displayed as a best shot image of still image. Furthermore, in the present embodiment, a change in the face of the person whose image is picked up is detected and when a predetermined change occurs, the changed face image is synthesized as a best shot image of still image.

Figure 5E:
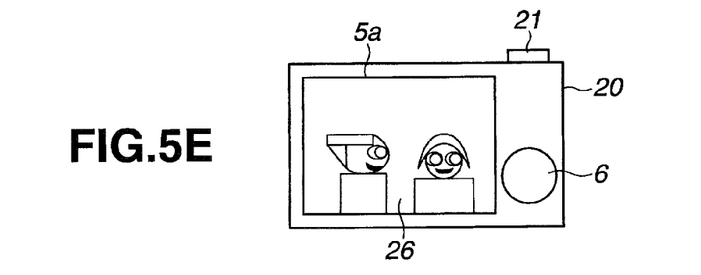

FIG. 5B to FIG. 5D show that best shot images 31a, 31b and 32b of still images generated when a change occurs in the face are displayed synthesized with a photographed image 25 which is a movie that changes from moment to moment. FIG. 5E shows a status which is returned to a live view image display 26 after the best shot synthesis mode ends.

In the present embodiment, the photographed image 25 is recorded and the best shot images 31a, 31b and 32b are recorded together with time information corresponding to the display time of the photographed image 25. In the present embodiment, a synthesized image of the photographed image and the best shot image may also be recorded.

Figure 6:
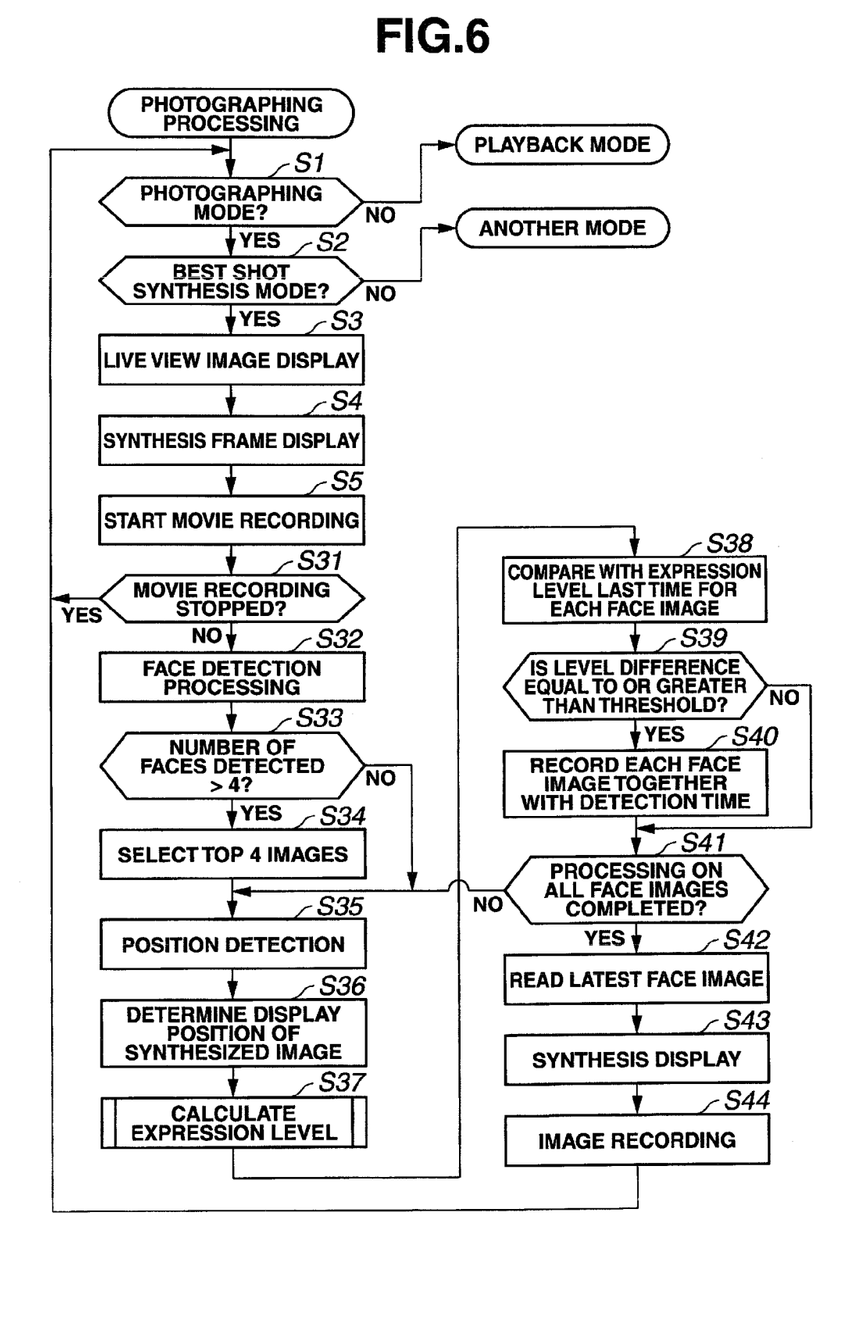
FIG. 6 is a flowchart for illustrating operation of the second embodiment.

Next, operation of the present embodiment configured as shown above will be described with reference to a flowchart in FIG. 6. In FIG. 6, the same procedures as those in FIG. 3 will be assigned the same reference numerals and description thereof will be omitted.

The procedure in steps S1 to S5 is similar to that of the first embodiment. In the present embodiment, in a best shot synthesis mode, the signal processing and control section 1 starts recording picked-up movie not only in the temporary recording section 3 but also in the recording section 4 in step S5. The signal processing and control section 1 continues to record the movies until it is determined in step S6 that an operation of stopping the recording of the movie is performed. Note that individual processing in the photographing apparatus 10 such as image processing on a picked-up image, image synthesis processing, display processing, recording processing, face detection processing, and calculation of an expression level, is similar to that in the first embodiment in FIG. 1.

The signal processing and control section 1 performs face detection processing in step S32. The signal processing and control section 1 determines whether or not the number of faces detected in the photographed image is more than 4 (step S33). When the number of faces is more than 4, the signal processing and control section 1 selects only four faces in step S34. For example, the signal processing and control section 1 selects four faces in descending order of size, four faces on the center side of the image, and so on. Note that, the signal processing and control section 1 may also display a message for selection on the display screen 5a so that the user selects four faces. When the number of faces in the photographed image is equal to or fewer than 4, the signal processing and control section 1 moves the process from step S33 to step S35.

Next, the signal processing and control section 1 detects the position on the display screen 5a of the face image detected from the picked-up image (step S35). Next, the signal processing and control section 1 determines the location on the display screen 5a of the best shot image. That is, the signal processing and control section 1 determines the display positions of the best shot images corresponding to the people selected in correspondence with the horizontal positions of the faces of four or fewer people selected from the photographed image (step S36). Next, the signal processing and control section 1 calculates the expression level of the detected face in step S37.

In next step S38, of the present embodiment, the signal processing and control section 1 compares the expression level calculated this time with the expression level calculated last time for each of the faces of the selected people. In step S39, it is determined whether or not the level difference in the expression level is equal to or greater than a predetermined threshold. When the level difference is equal to or greater than the predetermined threshold, that is, when the expression of the face has changed relatively a lot, the signal processing and control section 1 records the face image together with the time at which the face image is detected in the temporary recording section 3 as a partial image (best shot image) in the form of a still image in step S40.

Thus, the expression level of a face image is detected at every predetermined time, and respective face images whose level difference from the expression level last time exceeds a predetermined threshold are recorded as still images together with the times at which the faces are detected.

The signal processing and control section 1 determines in step S41 whether or not processing on all face images of the selected people has been completed and when the processing has not been completed, the signal processing and control section 1 repeats the processing in steps S35 to S40. When the processing on all face images of the selected people is completed, the signal processing and control section 1 reads the face image which corresponds to the selected person and which is the latest image recorded as a still image from the temporary recording section 3 in step S42. The signal processing and control section 1 synthesizes the best shot image recorded as a still image with the movie being picked up and displays the synthesized image. In step S44, the signal processing and control section 1 records the face image recorded in the temporary recording section 3 together with information of the detection time in the recording section 4.

Thus, the present embodiment can obtain effects similar to those in the first embodiment also at the time of recording a movie, changes a best shot image to be synthesized every time the expression changes, and can thereby obtain photographed images full of variety.

Note that, best shot images have been described as still images, but, by using the M compression sections 1i and 1j, best shot images may also be recorded as movies in addition to picked-up images of movies.

Figure 7:
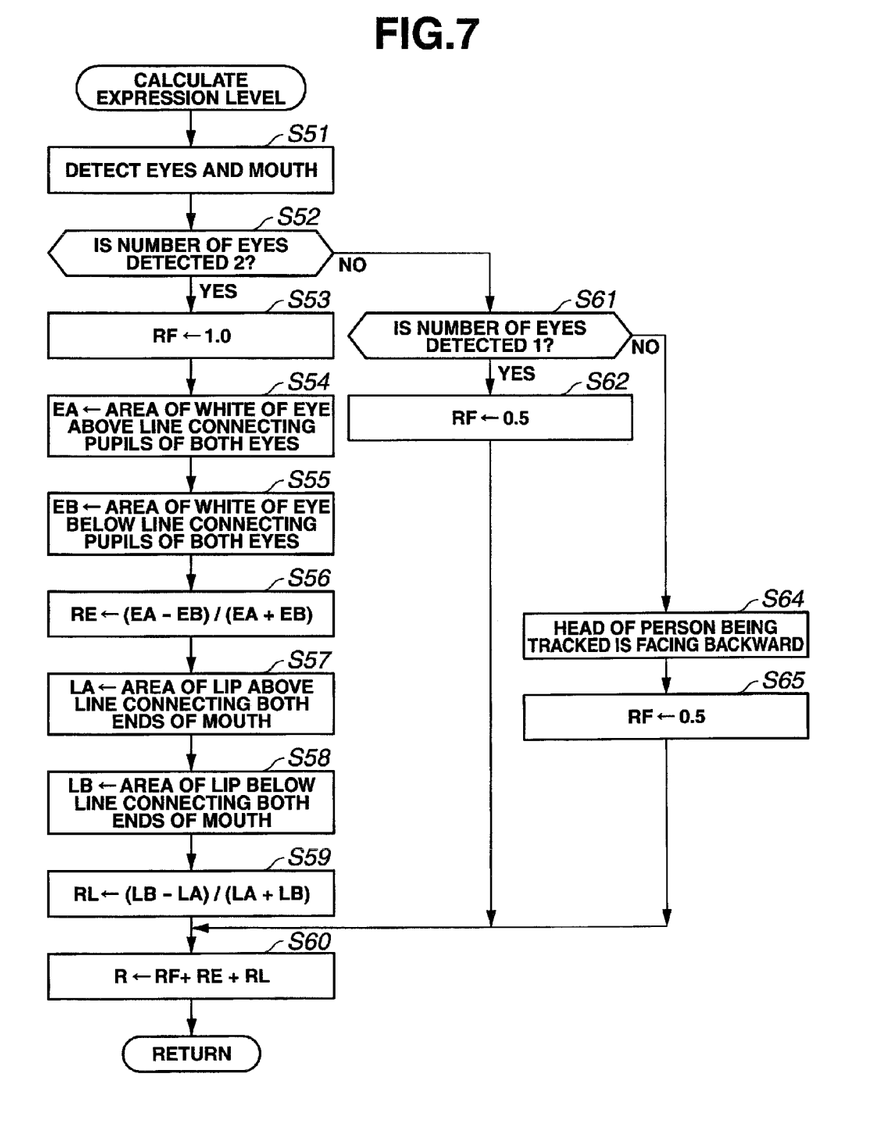
FIG. 7 is a flowchart illustrating an example of expression level calculation method.

Next, the method of calculating expression levels in steps S8, S14 and S37 in FIG. 3 and FIG. 6 will be described with reference to FIG. 7. FIG. 7 is a flowchart illustrating an example of the method of calculating expression levels.

The expression level shown in FIG. 7 is calculated as expression level R=RF+RE+RL, where RF denotes a score relating to the orientation of the face, RE denotes a score relating to the eyes, and RL denotes a score relating to the mouth. In step S51, the signal processing and control section 1 detects the eyes and mouth from the detected face. In step S52, the signal processing and control section 1 determines whether or not the number of the eyes detected from the face is two.

When the signal processing and control section 1 has successfully detected two eyes from the face, it substitutes 1.0 into the score RF assuming that the face is facing forward (step S53). Next, the signal processing and control section 1 calculates the score RE relating to the eyes in steps S54 to S56 and calculates the score RL relating to the mouth in steps S57 to S59.

In step S54, the signal processing and control section 1 substitutes the area of the white of the eye above the line connecting the pupils of both eyes into a variable EA. In next step S55, the signal processing and control section 1 substitutes the area of the white of the eye below the line connecting the pupils of both eyes into a variable EB. For example, in the case of a smile, the outer and inner corners of the eye often turn downward. When the outer and inner corners of the eye turn downward, the ratio between the areas of the white of the eye below and above the horizontal line that passes through the center of the pupil changes. Thus, the signal processing and control section 1 calculates the areas of the white of the eye above and below the line of the pupil (step S54, S55) and calculates the score RE relating to the eyes using the ratio between both areas. That is, the signal processing and control section 1 assumes the score RE to be (EA−EB)/(EA+EB) (step S56).

Furthermore, in step S57, the signal processing and control section 1 substitutes the area of the lip above the line connecting both ends of the mouth into a variable LA. In next step S58, the signal processing and control section 1 substitutes the area below the line connecting both ends of the mouth into a variable LB. For example, in the case of a smile, both ends of the mouth are often lifted. When both ends of the mouth are lifted, the ratio between the areas of the lip above and below the line segment connecting both ends of the mouth changes. The signal processing and control section 1 then calculates the areas of the lip above and below the line segment connecting both ends of the mouth (step S57, S58), and calculates the score RL using the ratio between both areas. That is, the signal processing and control section 1 assumes the score RL to be (LB−LA)/(LA+LB) (step S59).

Furthermore, when the signal processing and control section 1 determines in step S52 that the number of the detected eyes is not 2, the signal processing and control section 1 determines in step S61 whether or not the number of eyes is 1. When the number of eyes is 1, the signal processing and control section 1 substitutes 0.5 into the RF. On the other hand, when the signal processing and control section 1 determines that the number of the detected eyes is not 1, the signal processing and control section 1 determines in step S64 that the head of the person being tracked is facing backward and substitutes 0.5 into the RF (step S65).

The signal processing and control section 1 adds up the scores RF, RE and RL calculated in steps S59, S62 and S65 and assumes the addition result to be a value R of the expression level (step S60).

Thus, an example has been described in FIG. 7 in which the expression level is calculated based on the orientation of the face, the shape of the eye and the shape of the mouth, but the expression level may also be calculated using other techniques. For example, the expression level may be determined based on whether the mouth is open or closed. And the orientation of the face may be determined not only by the number of eyes but also by the ratio of hair to the head or the direction of gaze or the like. Furthermore, the above-described embodiments have described an example in which a best shot image is selected based on the expression level in consideration of the orientation of the face, but the best shot image may be selected based on the expression level obtained from the luminance level of the head or pose of the whole body without being limited to the expression level of the face.

In the aforementioned embodiments, the photographing section 2 is used as the source from which a source image is acquired, but the present invention is not limited thereto, and, for example, an image recorded in the recording section 4 may be acquired as the source image or an image inputted from an external input I/F 7 may be acquired as the source image.

Thus, in the aforementioned embodiments, best shot images are synthesized with a picked-up image, displayed and recorded, and it is thereby possible to obtain an enjoyable photographed image. The photographer picks up an image at timing judged by the photographer himself/herself to be the right moment to take a picture based on the situation on the spot, and the image synthesis apparatus displays the image pickup result on a full screen and records it. This allows the photographer to perform photographing that reflects his/her intention. Furthermore, partial images obtained by extracting the object are displayed in a partial region of a photographed image, and it is thereby possible to easily relive the object and the atmosphere on the spot during playback. Reliving can be easily performed by displaying an expressive face image or the like of the object as the partial image. Furthermore, it is possible to obtain images of full variety by displaying only varying face images.

Of the techniques described here, most of the control and functions principally described in the flowchart can be set by a program and the aforementioned control and functions can be implemented by a computer reading and executing the program. The whole or part of the program can be recorded or stored as a computer program product in a flexible disk, portable medium such as CD-ROM and nonvolatile memory, recording medium such as hard disk, volatile memory, and can be circulated or supplied when the product is shipped or via a portable medium or communication channel. The user can easily implement the image synthesis apparatus of the present embodiment by downloading the program via a communication network and installing the program in a computer or installing the program in the computer from a recording medium.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image pickup apparatus comprising:
an optical section configured to form an image of light beams from one person or plural objects;
an image sensor configured to pick up the image formed including one or plural pictures of one or plural persons as the objects;
a temporary recording memory;
an operation section configured to set photographing operation modes including a best shot synthesis mode, and configured for operation input for photographing a still image by a user;
a signal processor comprising:
an acquisition section configured to sequentially acquire first images including the one or plural pictures of one person or plural persons, the one or plural pictures being outputted from the image sensor, wherein the temporary recording memory is configured to sequentially buffer the first images sequentially acquired by the acquisition section;
a first image processor configured to sequentially perform, on the first images in the temporary record memory, an image processing that causes the first images to be adapted for sequential live view display or an image data recording format at the time of photographing, and generate a second image which is a photographed image;
a feature determining section configured to determine, from the second image, presence or absence of the one or plural pictures of one or plural persons, and an aspect of the one or plural picture of the one or plural persons;
a second image processor configured to perform, on the first images in the temporary record memory, a trimming processing that extracts a partial region of the one of plural pictures of one person or plural persons, when a result of determination by the feature determining section shows presence of the one or plural pictures of one or plural persons, and generate one or plural partial images;
a best shot image detection section configured to select, from among the one of plural partial images, one or plural best shot images to be synthesized with the second image, on the basis of the number of detection of the one or plural pictures of one or plural persons and of an aspect of the one or plural pictures of one or plural persons determined by the feature determining section;
an image synthesis section configured to perform, on the second image, synthesis processing of synthesizing an image serving as a synthesis frame and the one or plural best shot images selected by the best shot image detection section, and generate a third image as an image subjected to the synthesis processing;
an image selection section configured to select one of the second and third images in accordance with a setting of the photographing operation mode through the operation section and a result of determination by the feature determining section, and output the selected image as a fourth image which is a recorded image, the image selection section selecting the third image and outputting the selected third image as fourth image when the photographing operation mode set through the operation section is the best shot synthesis mode, an operation input for photographing a still image has been made by the user, and the feature determining section has determined the one or plural pictures of one or plural persons from the second image, and otherwise selecting the second image and outputting the selected second image as the fourth image; and
a display controller configured to transmit a display control signal based on the fourth image processed to be selected and outputted by the selection section; and
a display configured to display and output a display image based on the control signal from the display controller,
wherein the third image is an image in which the synthesis frame is synthesized in an upper region of the second image, and in which a synthesis processing has been performed for arranging the best shot image in a region corresponding to the synthesis frame.

2. The image pickup apparatus according to claim 1, further comprising a recording section which is a memory capable of recording photographed images, and a recording control section configured to record, in the recording section, an image which is based on the fourth image.

3. The image pickup apparatus according to claim 2, wherein the operation section includes a selection section that optionally selects the one or plural partial images based on a user input, and the image synthesis section performs the synthesis processing of synthesizing the second image with a partial image selected by the selection section, and generates the third image as an image subjected to the synthesis processing.

4. The image pickup apparatus according to claim 1, wherein the feature determining section determines an aspect of a body, a head, or a face of the one or plural pictures.

5. The image pickup apparatus according to claim 4, wherein the feature determining section calculates an aspect level based on the aspect of the body, the head, or the face of the one or plural pictures.

6. The image pickup apparatus according to claim 5, wherein the aspect level is calculated based on a pose of the body of the one or plural pictures, the aspect level is calculated based on an orientation or a size of the head, or the aspect level is calculated based on an expression of the face.

7. The image pickup apparatus according to claim 6, wherein the first images including the one or plural pictures is movie data, or live view image data, and when the aspect level is calculated, the body, the head, or the face of the one or plural pictures is acquired as required, and the aspect levels of the body, the head, or the face acquired are each compared.

8. The image pickup apparatus according to claim 7, wherein when the aspect level is calculated, one with a high aspect level is selected as a result of comparing each aspect of the body, the head, or the face acquired as required.

9. The image pickup apparatus according to claim 7, further comprising a tracking section that tracks the body, the head, or the face of the one or plural pictures.

10. A photographing method to be applied to an image pickup apparatus, the method comprising:

a step of sequentially acquiring first images including one or plural pictures of one person or plural persons as an object from an optical section and an image sensor included in the image pickup apparatus;

a step of sequentially buffering first images sequentially acquired by the step of sequentially acquiring one or plural images;

a step of setting photographing operating modes including a best shot synthesis mode;

a step of receiving a user operation input for photographing a still image;

a first image processing step of sequentially performing, on the first images, an image processing that causes the first images to be adapted for sequential live view display or an image data recording format at the time of photographing, and generating a second image which is a photographed image;

a feature determining step of determining, with respect to the second image, presence or absence of the one or plural pictures of one person or plural persons, and an aspect of the one or plural pictures of the one or plural persons;

a second image processing step of performing, on the first image, a trimming processing that extracts a partial region of the one or plural pictures of one person or plural persons, when a result of determination by the feature determining step shows presence of the one or plural pictures of one or plural persons, and generating one or plural partial images subjected to the trimming processing;

a best shot image detecting step of selecting, from among the one or plural partial images, one or plural best shot images to be synthesized with the second image, on the basis of the number of detection of the one or plural pictures of one or plural persons and of an aspect of the one or plural pictures of one or plural persons determined by the feature determining step;

an image synthesis step of performing, on the second image, synthesis processing of synthesizing an image serving as a synthesis frame and the one or plural best shot images selected by the best shot image detection step, and generating a third image as an image subject to the synthesis processing;

an image selecting step of selecting one of the second and third images in accordance with a photographing mode detected by the photographing mode detecting step and with a result of determination by the feature determining step, and outputting the selected image as a fourth image which is a recorded image, the image selecting step selecting the third image and outputting the selected third image as fourth image when the photographing operation mode detected by the photographing operating detecting step is set to the best shot synthesis mode, an operation input for photographing a still image has been made by the user, and the feature determining step has determined the one or plural pictures of one or plural persons from the second image, and otherwise selects the second image and outputs the selected second image as the fourth image; and a display control step of transmitting a display control signal to a display of the image pickup apparatus based on the fourth image subjected to the selecting processing and outputted, wherein the third image is an image in which the synthesis frame is synthesized in an upper region of the second image, and in which a synthesis processing has been performed for arranging the best shot image in a region corresponding to the synthesis frame.

* * * * *